(12) United States Patent
Fortunato (10) Patent No.: US 11,550,452 B1
(45) Date of Patent: Jan. 10, 2023

(54) PRESENTATION OF A MEDIA SEQUENCE (71) Applicant: GOPRO, INC., San Mateo, CA (US)

(72) Inventor: Steven Fortunato, Solana Beach, CA (US)

(73) Assignee: GoPro, Inc., San Mateo, CA (US)

( * ) Notice: Subject to any disclaimer, the term of this patent is extended or adjusted under 35 U.S.C. 154(b) by 14 days.

(21) Appl. No.: 17/343,571

(22) Filed: Jun. 9, 2021

(51) Int. Cl.
G06F 3/0484 (2022.01)
G11B 27/10 (2006.01)

(52) U.S. Cl.
CPC ............ *G06F 3/0484* (2013.01); *G11B 27/10* (2013.01)

(58) Field of Classification Search
CPC ..... G11B 27/031; G11B 27/036; G11B 27/34; G11B 27/00; G11B 27/02; G06F 16/4393; G06F 3/04847; G06F 16/40; G06F 16/739; G06F 16/748; G06F 16/70; G06F 16/735; G06F 16/738
See application file for complete search history.

(56) References Cited

U.S. PATENT DOCUMENTS

| | | | |
|---|---|---|---|
| 7,805,678 B1* | 9/2010 | Niles | G06F 3/0483 715/726 |
| 7,890,867 B1* | 2/2011 | Margulis | G11B 27/34 715/202 |
| 11,169,680 B2* | 11/2021 | Park | G11B 27/031 |
| 2010/0281382 A1* | 11/2010 | Meaney | G11B 27/34 715/723 |
| 2012/0210230 A1* | 8/2012 | Matsuda | G06F 3/04842 715/723 |
| 2013/0124996 A1* | 5/2013 | Margulis | G11B 27/34 715/719 |
| 2013/0195421 A1* | 8/2013 | Chen | G11B 27/034 348/E7.003 |
| 2013/0332836 A1* | 12/2013 | Cho | G11B 27/34 715/723 |
| 2014/0380168 A1* | 12/2014 | Wu | G11B 27/34 715/723 |
| 2015/0346984 A1* | 12/2015 | Flint | G11B 27/102 715/720 |
| 2022/0028427 A1* | 1/2022 | Matsuda | G11B 27/34 |

OTHER PUBLICATIONS

Gaggy et al., A_visual_authoring_environment_for_prototyping_multimedia_presentations, 2002, IEEE, 8 pages.*

Fulda et al., TimeLineCurator_Interactive_Authoring_of_Visual_Timelines_from_Unstructured_Text, 2013, IEEE, 10 pages.*

* cited by examiner

*Primary Examiner* — Linh K Pham (74) *Attorney, Agent, or Firm* — Esplin & Associates, PC (57) ABSTRACT

A graphical user interface may switch between presentation of a timeline representation of media items and a tile representation of media items. The timeline representation may include graphical representation of the lengths of the media items. The tile representation may include graphical representation of the content of the media items.

18 Claims, 6 Drawing Sheets

PRESENTATION OF A MEDIA SEQUENCE

FIELD

This disclosure relates to presenting different representations of a media sequence.

BACKGROUND

A user interface for editing a video may provide a timeline view of the video clip(s) being edited. Such a view may make applying effects to the video clip(s) difficult and cumbersome.

SUMMARY

This disclosure relates to presenting a media sequence. A sequence of media items may include media items ordered in a sequence. A timeline representation of the sequence of media items may be presented. The timeline representation may include timeline media elements that graphically represent lengths of the media items. A tile representation of the sequence of media items may be presented. The tile representation may include tile media elements that graphically represent content of the media items.

A system that presents a media sequence may include one or more electronic storage, processor, and/or other components. The electronic storage may store information relating to media items, information relating to a sequence of media items, information relating to timeline representations, information relating to tile representations, and/or other information.

The processor(s) may be configured by machine-readable instructions. Executing the machine-readable instructions may cause the processor(s) to facilitate presenting a media sequence. The machine-readable instructions may include one or more computer program components. The computer program components may include one or more of a timeline representation component, a tile representation component, and/or other computer program components.

The timeline representation component may be configured to present a timeline representation of a sequence of media items. The sequence of media items may include media items ordered in a sequence. The timeline representation may include timeline media elements that graphically represent lengths of the media items.

In some implementations, the timeline representation of the sequence of media items may be presented in a user interface for selecting segments of the media items for inclusion in the sequence of media items.

The tile representation component may be configured to present a tile representation of the sequence of media items. The tile representation may include tile media elements that graphically represent content of the media items.

In some implementations, the tile representation of the sequence of media items may include an individual tile media element for an individual video or an individual image in the sequence of media items. In some implementations, the tile representation of the sequence of media items may include an individual tile media element for an individual video segment in the sequence of media items.

In some implementations, the tile representation of the sequence of media items may be presented in a user interface for applying an effect to the sequence of media items. In some implementations, the tile representation of the sequence of media items may be presented in a user interface for changing a playback speed of the media items in the sequence of media items. In some implementations, the tile representation of the sequence of media items may be presented in a user interface for changing an order of the media items in the sequence of media items. In some implementations, the tile representation of the sequence of media items may be presented in a user interface for adding or removing the media items in the sequence of media items.

In some implementations, presentation of the tile representation of the sequence of media items may include a change of the timeline representation of the sequence of media items into the tile representation of the sequence of media items. The change of the timeline representation of the sequence of media items into the tile representation of the sequence of media items may include removal of the timeline representation of the sequence of media items and addition of the tile representation of the sequence of media items.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
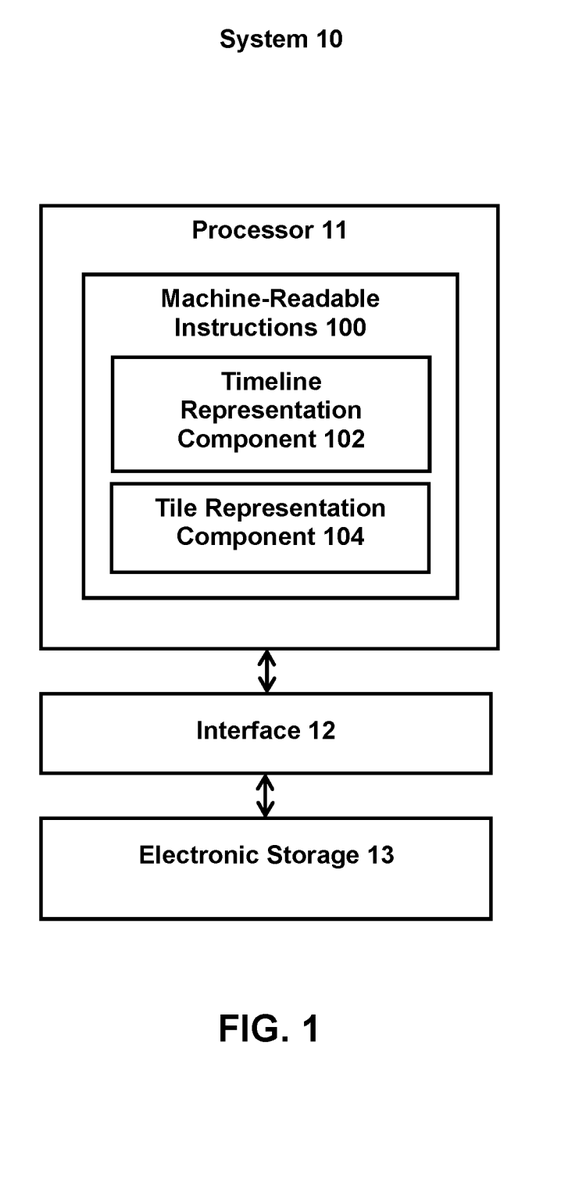
FIG. 1 illustrates a system that presents a media sequence.

FIG. 1 illustrates a system 10 that presents a media sequence. The system 10 may include one or more of a processor 11, an interface 12 (e.g., bus, wireless interface), an electronic storage 13, and/or other components. A sequence of media items may include media items ordered in a sequence. A timeline representation of the sequence of media items may be presented by the processor 11. The timeline representation may include timeline media elements that graphically represent lengths of the media items. A tile representation of the sequence of media items may be presented by the processor 11. The tile representation may include tile media elements that graphically represent content of the media items.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store information relating to media items, information relating to a sequence of media items, information relating to timeline representations, information relating to tile representations, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate presenting a media sequence. The machine-readable instructions 100 may include one or more computer program components. The machine-readable instructions 100 may include one or more of a timeline representation component 102, a tile representation component 104, and/or other computer program components.

The timeline representation component 102 may be configured to present a timeline representation of a sequence of media items. A timeline representation of a sequence of media items may be presented on one or more displays. A timeline representation of a sequence of media items may be presented within one or more graphical user interfaces.

A display may refer to an electronic device that provides visual presentation of information. A display may be configured to present visual content, graphical user interface(s), and/or other information. In some implementations, a display may include a touchscreen display. A touchscreen display may be configured to receive user input via a user's engagement with the touchscreen display. A user may engage with the touchscreen display via interaction with one or more touch-sensitive surfaces/screens and/or other components of the touchscreen display. A display may be a standalone device or a component of a computing device, such as a display of a mobile device (e.g., camera, smartphone, smartwatch, tablet, laptop) or a desktop device (e.g., touch monitor). User interaction with elements of the graphical user interface(s) may be received through the display (e.g., touchscreen display) and/or other user interface devices (e.g., keyboard, mouse, trackpad).

A graphical user interface may refer to a user interface that enables a user to interact with the system 10 through one or more interface elements. A graphical user interface may refer to a user interface that enables the system 10 to provide information to a user through one or more interface elements. A graphical user interface may include interface elements. A graphical user interface may be static or dynamic. A graphical user interface may include a static configuration of interface elements and/or include dynamic configurations of interface elements that changes (e.g., with time, based on user interaction with one or more interface elements). Multiple/different interface elements may be presented/included within a graphical user interface at the same time, may be presented/included within a graphical user interface at different times, and/or may be presented/included within a graphical user interface responsive to user interaction with one or more other interface elements and/or other information.

An interface element may refer to a graphical element of the user interface, such as window, icon, button, graphic, and/or other visual indicator. An interface element may visually provide information and/or enable a user to provide inputs to the system 10. For example, an interface element may visually provide information determined by the system 10 and/or a user may interact (e.g., engage, toggle, manipulate) with an interface element to provide one or more input to the system 10. A graphical user interface may facilitate interaction of the user with one or more of the interface elements via the user input received through one or more user interface devices (e.g., touchscreen display, keyboard, mouse, trackpad) and/or other user input. For example, a graphical user interface may present/include the interface elements in a particular arrangement and enable the user to interact with individual interface elements by engaging with locations corresponding to the individual interface elements on a touchscreen display.

A sequence of media items (media sequence) may refer to an arrangement of media items. A sequence of media items may refer to an ordering of media items. A sequence of media items may refer to a particular order in which media items are arranged/follow each other. A sequence of media items may include media items ordered in a sequence. A sequence of media items may include (define) a sequence (a particular arrangement/order) of media items. A sequence of media items may provide a view of the media items included in the sequence. For example, a sequence of media items may refer to an arrangement/order of media items in a media summary. For example, a sequence of media items may be generated to include a particular arrangement of one or more images, one or more videos, and/or other media items for playback. For example, a sequence of media items may refer to a video edit that include one or more images, one or more videos, and/or other media items arranged in a particular sequence. A media item may refer to an item that may be visually and/or audibly consumed. A media item may refer to a multimedia item. For example, a media item may include an image, a video, a sound clip, and/or other media item.

A timeline representation of a sequence of media items may refer to a representation of the sequence of media items that conveys information relating to temporal characteristics of the sequence of media items. A timeline representation of a sequence of media items may visually represent lengths (e.g., durations) of the media items in the sequence of media items. A timeline representation of a sequence of media items may visually represent the total lengths of the media items (e.g., total duration of a video clip) and/or the lengths of the media items as they are to be presented within the sequence of media items (e.g., duration a video clip is to take in a video edit). One or more visual characteristics of the timeline representation may indicate the lengths of the media items.

A timeline representation of a sequence of media items may include and/or be made up of one or more interface elements. For example, a timeline representation may include timeline media elements that graphically represent lengths of the media items in the sequence of media items. A timeline media element may refer to an interface element that visually represent the length of a media item. A timeline media element may provide graphical representation of a length of a media item based on the size of the timeline media element. For example, the length of a timeline media element may represent the length of a media item.

In some implementations, a timeline representation of a sequence of media items may be presented in a user interface for selecting segments of the media items for inclusion in the sequence of media items. A timeline representation of a sequence of media items may be included within a user interface that allows a user to specify which temporal portions of the media items should be included in the sequence of media items. A timeline representation of a sequence of media items may be included within a user interface that allows a user to specify the lengths that media items should occupy in the sequence of media items. For example, a sequence of media items may include a video summary/video edit of one or more images and/or one or more videos. A timeline representation of the video summary/video edit may be included within a user interface that allows a user to specify which temporal portions of the video(s) should be included in the video summary/video edit. A timeline representation of the video summary/video edit may be included within a user interface that allows a user to specify the lengths that the image(s) and/or the video(s) should occupy in the video summary/video edit.

FIGS. 3A, 3B, 3C, and 3D illustrate an example graphical user interface 300 with different representations of a sequence of media items. The views of the graphical user interface 300 in FIGS. 3A, 3B, 3C, and 3D are provided merely as examples, and the arrangement and visual aspects of the graphical user interface may vary depending on the implementation. In some implementations, the graphical user interface may include additional features and/or alternative features. In some implementations, the graphical user interface may not include features shown in FIGS. 3A, 3B, 3C, and 3D.

Figure 3A:
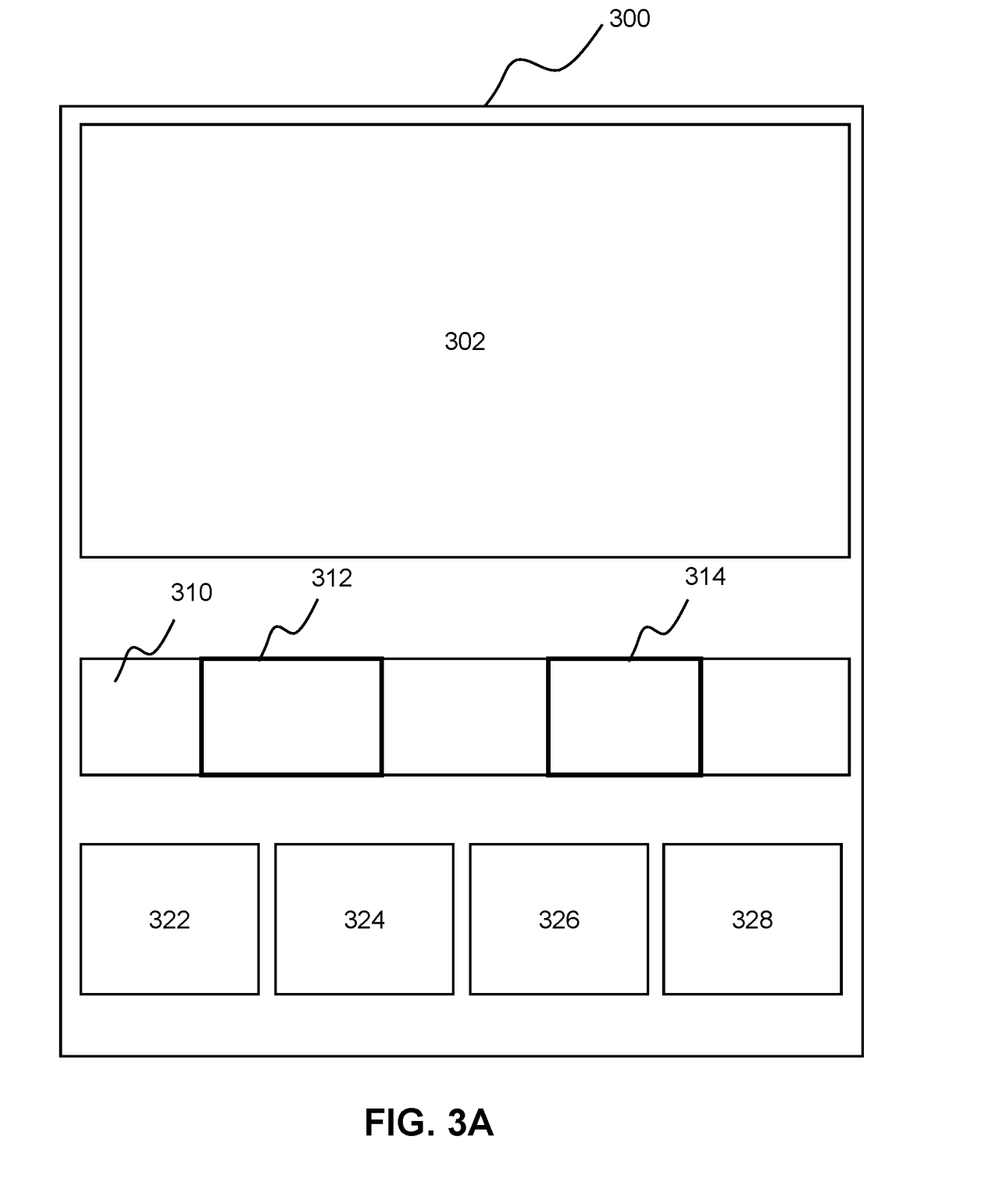
FIG. 3A illustrates an example timeline representation of a sequence of media items.

Referring to FIG. 3A, the graphical user interface 300 may include a visual content playback portion 302. The visual content playback portion 302 may include presentation of visual content (visual content of image(s), video(s), video edit(s)). The graphical user interface 300 may include a timeline representation 310 of a sequence of media items. The timeline representation 310 may represent lengths of the media items in the sequence of media items. The size (e.g., length) of the timeline representation 310 may reflect the total lengths of the media items. The size of the timeline representation 310 may reflect both the lengths of the media items that have been selected (selected segments of the media items) for inclusion in the sequence of media items (e.g., a video summary/video edit) and may reflect the lengths of the media items that have not been selected (non-selected segments of the media items) for inclusion in the sequence of media items. The size of the timeline representation 310 may reflect the lengths that the media items should occupy in the sequence of media items (e.g., total length of the video summary/video edit). The timeline representation 310 may provide a continuous representation of the lengths of the media items in the sequence of media items.

The timeline representation 310 may include individual timeline media elements that graphically represent the lengths of the individual media items. Individual timeline media elements (total length timeline media elements) may graphically represent the total lengths of the individual media items. Individual timeline media elements (selected segment timeline media elements) may graphically represent individual segments of the media items that have been selected for inclusion in the sequence of media items. For example, in FIG. 3A, the timeline representation 310 may graphically represent total length(s) of media items in the sequence of media items (e.g., a scrubber view of the total lengths of video clips that are available for inclusion in a video edit), and the timeline representation 310 may include timeline media elements 312, 314 that graphically represent two segments of the media items that have been selected for inclusion in the sequence of media items (e.g., markers that show segments of the video clips selected for inclusion in a video edit). Timeline representation 310 may allow a user to select/modify segments of the media items included in the media sequence by selecting, adding, removing, and/or modifying (e.g., shortening, lengthening) the timeline media elements.

The graphical user interface may include one or more interface elements that enable a user to select one or more effects to be applied to the sequence of media items. An effect may refer to a process/tool that changes the sequence of media items. An effect may change which media items are included in the sequence of media items. For example, an effect (media item addition/removal effect) may allow to a media item to be added to or removed from the sequence of media items. An effect may change ordering of media items in the sequence of media items. For example, an effect (media ordering effect) may allow reordering of media items in the sequence of media items. An effect may change one or more visual characteristics of the media items. For example, an effect (visual effect) may change existing visual characteristic(s) of the media items, add new visual characteristic(s) to the media items, and/or remove existing visual characteristic(s) from the media items. An effect may change one or more audio characteristics of the media items. For example, an effect (audio effect) may change existing audio characteristic(s) of the media items, add new audio characteristic(s) to the media items, and/or remove existing audio characteristic(s) from the media items. An effect may change one or more temporal characteristics of the media items. For example, an effect (temporal effect) may change the playback speed of the media items (perceived playback speed of selected segments of the media items) during media sequence playback (e.g., speed up, speed down, reverse speed, freeze frame). Other types of effects are contemplated.

For example, in FIG. 3A, the graphical user interface 300 may include effect elements 322, 324, 326, 328. User interaction with the effect elements 322, 324, 326, 328 may allow a user to apply the selected effect to one or more parts of the sequence of media items. However, it may be difficult and/or cumbersome to use the timeline representation 310 to select parts of the sequence of media items for application of the effect(s). Use of the timeline representation 310 may make it difficult to show which parts have been selected for application of the effect(s).

The tile representation component 104 may be configured to present a tile representation of the sequence of media items. A tile representation of a sequence of media items may be presented on one or more displays. A tile representation of a sequence of media items may be presented within one or more graphical user interfaces.

A tile representation of a sequence of media items may refer to a representation of the sequence of media items that conveys information on separate media items included in the sequence of media items via separate visual element. A tile representation of a sequence of media items may visually represent individual media items in the sequence of media items using separate visual elements. Rather than providing a continuous representation of the media items, the tile representation may provide discontinuous representations of the media items in the sequence of media items.

A tile representation of a sequence of media items may include and/or be made up of one or more tile media elements. A tile media element may graphically represent content of a media item. For example, the visual appearance of a tile media element may be generated from the visual content of the media item represented by the tile media element. For example, a tile media element may include a thumbnail of the media item. A tile media element may have a tile-shaped shaped (e.g., square shape, rectangular shape, circle shape) element that includes a thumbnail image of the media item. A tile media element may refer to a visual representation of a media item that may be arranged like a tile for display. A tile media element may have one or more sharp corners, one or more rounded corners, and/or other corners.

In some implementations, a tile representation of a sequence of media items may include an individual tile media element for individual media items in the sequence of media items. For example, a tile representation of a sequence of media item may include an individual tile media element for an individual video or an individual image in the sequence of media items. That is, every video/image in the sequence of media items may be represented by a separate tile media element. For example, referring to FIG. 3A, timeline media elements 312, 314 may represent two segments of a single video clip. The tile representation of the sequence of media items may include a single tile media element to represent the single video clip, even though two separate segments of the video clips has been selected for inclusion. A user may select both segments of the video clip via selection of the single tile media element.

In some implementations, a tile representation of a sequence of media items may include an individual tile media element for individual parts of the media items selected for inclusion in the sequence of media items. For example, a tile representation of a sequence of media item may include an individual tile media element for an individual video segment in the sequence of media items. That is, every video segment selected for inclusion in the sequence of media items may be represented by a separate tile media element. For example, referring to FIG. 3A, timeline media elements 312, 314 may represent two segments of a single video clip. The tile representation of the sequence of media items may include separate tile media elements for individual segments of the single video clip. A user may select individual segments of the video clip via selection of the individual tile media elements.

The tile representation of the sequence of media items may make it easier/more intuitive for a user to select media items/parts of media items to which effect(s) are to be applied. Use of the tile representation may make it easy to show which parts have been selected for application of the effect(s).

In some implementations, the tile representation of the sequence of media items may be presented in a user interface for applying one or more effects to the sequence of media items. For example, the tile representation of the sequence of media items may be presented in a user interface for changing a playback speed of the media items in the sequence of media items (e.g., speed up, speed down, reverse speed, freeze frame). The tile representation of the sequence of media items may be presented in a user interface for changing an order of the media items in the sequence of media items. The tile representation of the sequence of media items may be presented in a user interface for adding or removing the media items in the sequence of media items. Presentation of the tile representation for application of other effects are contemplated.

In some implementations, presentation of the tile representation of the sequence of media items may include a change of the timeline representation of the sequence of media items into the tile representation of the sequence of media items. For example, a graphical user interface may change from presenting the timeline representation to presenting the tile representation. The change of the timeline representation of the sequence of media items into the tile representation of the sequence of media items may include removal of the timeline representation of the sequence of media items and addition of the tile representation of the sequence of media items. For example, the timeline representation may be removed from the graphical user interface and the tile representation may be added to the graphical user interface. The change of the timeline representation of the sequence of media items into the tile representation of the sequence of media items may include morphing of the timeline representation of the sequence of media items into the tile representation of the sequence of media items. For example, the timeline representation within the graphical user interface may smoothly change into the tile representation of the sequence of media items.

The representation of the sequence of media items may switch between the timeline representation and the tile representation based on operation being performed on the sequence of media items. For example, the timeline representation may be presented when a user is providing inputs on which segments of the media items are to be selected for inclusion in the media sequence, while the tile representation may be presented when a user is providing inputs on applying effects to the media sequence. For example, such switch in representation may result in the graphical user interface changing between provision of expanded timeline view/scrubber view of the media sequence (timeline representation) and provision of truncated cards to represent the media items (the tile representation). In some implementation, both the timeline representation and the tile representation may be presented at the same time. Such presentation may enable a user to interact with one or both of the representation in modifying the sequence of media items.

Figure 3B:
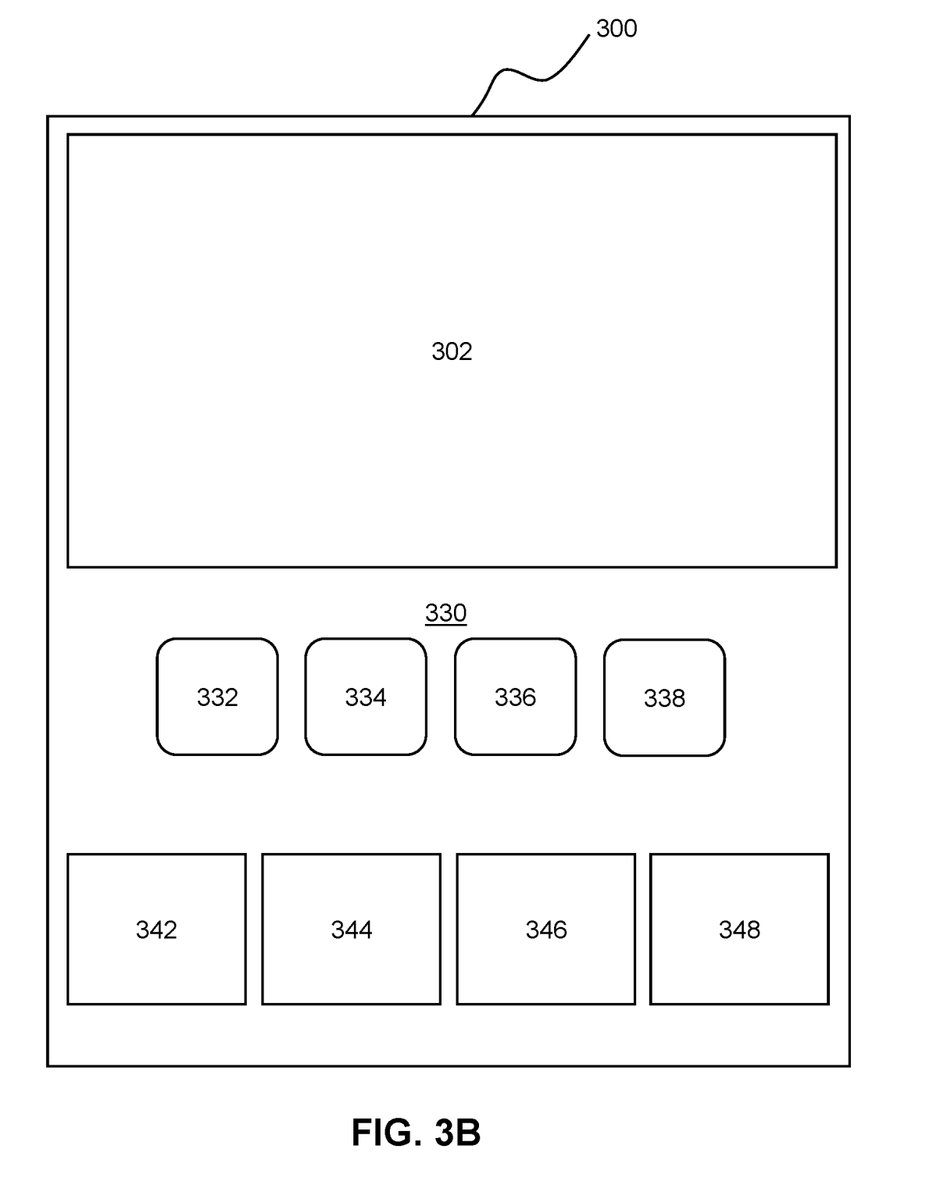
FIG. 3B illustrates an example tile representation of a sequence of media items.

Referring to FIG. 3B, the graphical user interface 300 may include a tile representation 330 of a sequence of media items. The tile representation 330 including tile media elements 332, 334, 336, 338 that represent media items in the sequence of media items. The tile media elements 332, 334, 336, 336 may represent individual media items (e.g., individual video clips, individual images) in the sequence of media items. The tile media elements 332, 334, 336, 336 may represent individual segments of the media items (e.g., individual segments of video clips) in the sequence of media items. The tile media elements 332, 334, 336, 338 may graphically represent the content of the media items. The tile media elements 332, 334, 336, 338 may include thumbnail images of the corresponding media items.

The graphical user interface may include one or more interface elements that enable a user to select one or more effects to be applied to the sequence of media items. The graphical user interface may include one or more interface elements that enable a user to select one or more characteristics of an effect to be applied to the sequence of media items. For example, in FIG. 3B, the graphical user interface 300 may include effect elements 342, 344, 346, 348. The effect elements 342, 344, 346, 348 may be the same as or different from the effect elements 322, 324, 326, 328 shown in FIG. 3A. For example, the effect elements 342, 344, 346, 348 may allow a user to select different sub-types of an effect, different strength of an effect, and/or other characteristics of an effect. A user may interact with one or more of the effect elements 342, 344, 346, 348 to select a desired effect/effect characteristic. A user may interact with one or more of the tile media elements 332, 334, 336, 338 to select parts of the media sequence to which the effect will be applied. In some implementations, the graphical user interface 300 may include a select-all element and/or a select-none element. User interaction with the select-all element may cause all of the tile media elements to be selected. User interaction with the select-all element may cause all of the corresponding media items/media item parts to be selected. User interaction with the select-none element may cause none of the tile media element/media items/media item parts to be selected (clear previous selection).

Figure 3C:
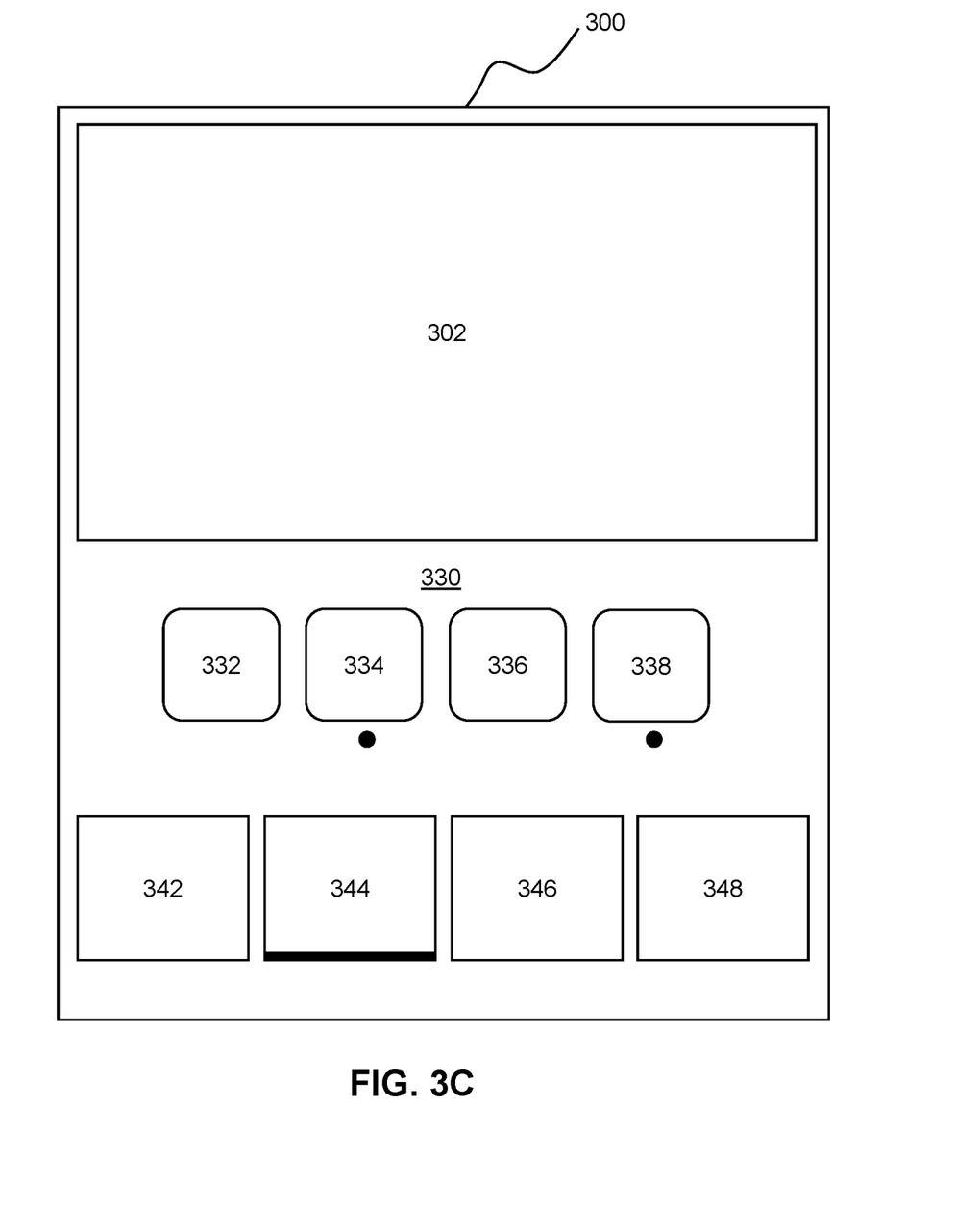
FIG. 3C illustrates an example tile representation of a sequence of media items.

For example, FIG. 3C shows the graphical user interface 300 after user interaction with the effect element 344 and the tile media element 334, 338. The visual appearance of the graphical user interface 300 may be changed to reflect user interaction with the effect element 344 and the tile media elements 334, 338. For example, a lower port of the effect element 344 may be filled to indicate that the corresponding effect has been selected. A dot may be presented below the tile media elements 334, 338 to indicate that the corresponding media items/media item parts have been selected for application of the selected effect. Other appearances of the graphical user interface are contemplated.

Figure 3D:
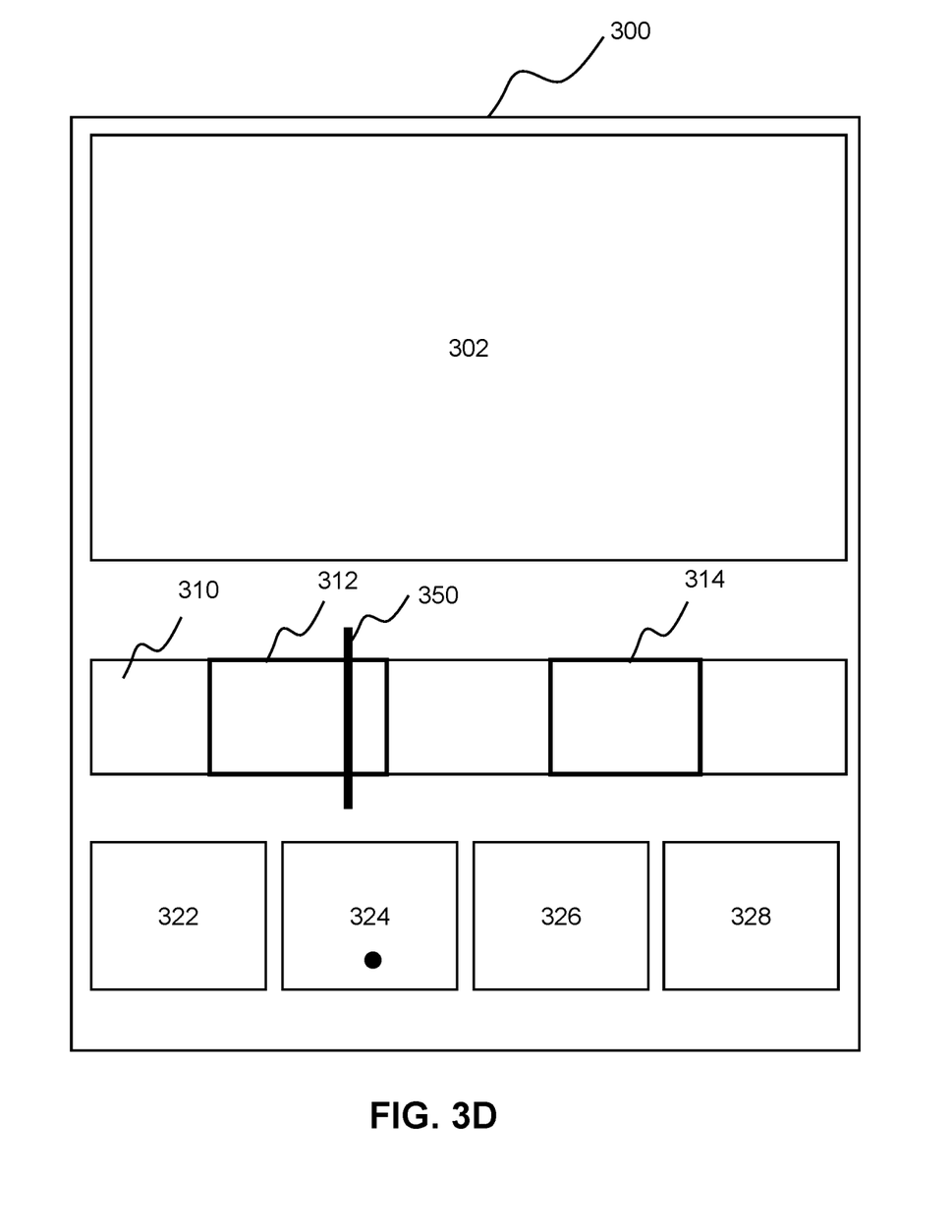
FIG. 3D illustrates an example timeline representation of a sequence of media items.

FIG. 3D shows the graphical user interface 300 with the timeline representation 310 after selection of an effect to the sequence of media items. The visual appearance of the graphical user interface 300 may be changed to reflect user selection of an effect corresponding to the effect element 324. For example, a dot may be presented within the effect element 324 to indicate that the corresponding effect has been applied to the sequence of media times. lo some implementations, such visual indicators may appear and disappear based on which portion of the media sequence is currently being viewed/worked on. For example, in FIG. 3D, an indicator 350 may indicate current play position for the sequence of media items. That is, the indicator 350 may indicate which moment (e.g., time-point) in the media sequence is being presented in the visual content playback portion 302. The dot may be presented within the effect element 324 to indicate that the corresponding effect has been applied/selected to be applied to the moment indicated by the indicator 350. The dot may be presented within the effect element 324 to indicate that the corresponding effect has been applied/selected to be applied to the media item/media item part in which the indicator 350 is located. The dot may disappear when the indicator 350 moves onto a part of the media sequence to which the effect has not been applied/selected to be applied.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer program components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
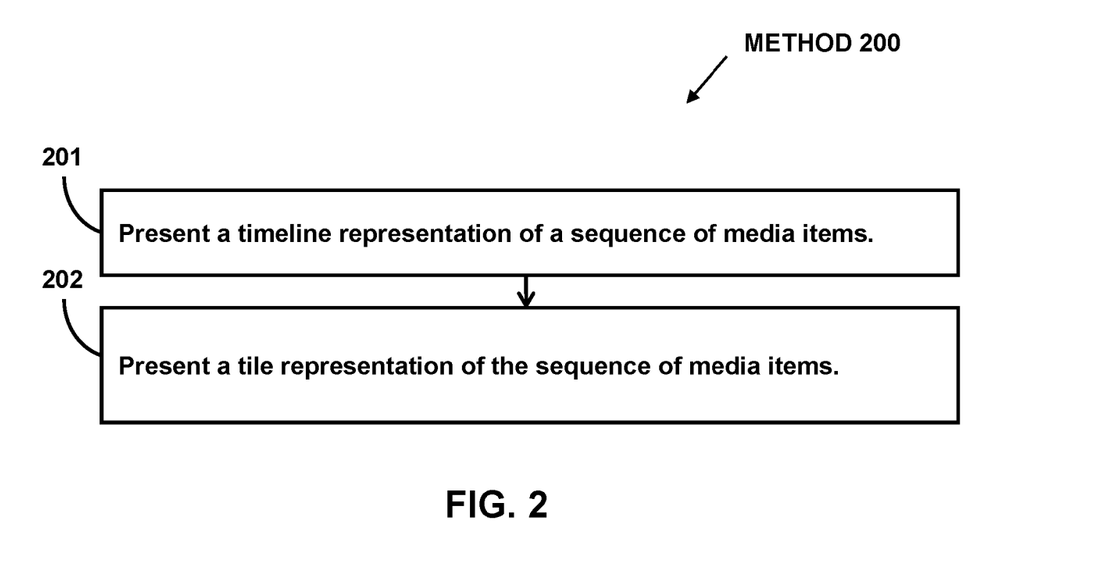
FIG. 2 illustrates a method for presenting a media sequence.

FIG. 2 illustrates method 200 for presenting an interface for indicating video editing decisions. The operations of method 200 presented below are intended to be illustrative. In some implementations, method 200 may be accomplished with one or more additional operations not described, and/or without one or more of the operations discussed. In some implementations, two or more of the operations may occur simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, a timeline representation of a sequence of media items may be presented. The sequence of media items may include media items ordered in a sequence. The timeline representation may include timeline media elements that graphically represent lengths of the media items. In some implementations, operation 201 may be performed by a processor component the same as or similar to the timeline representation component 102 (Shown in FIG. 1 and described herein).

At operation 202, a tile representation of the sequence of media items may be presented. The tile representation may include tile media elements that graphically represent content of the media items. In some implementations, operation 202 may be performed by a processor component the same as or similar to the tile representation component 104 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for presenting a media sequence, the system comprising:
   one or more physical processors configured by machine-readable instructions to:
   present a graphical user interface, the graphical user interface including a timeline representation of a sequence of media items, the sequence of media items including media items ordered in a sequence, the timeline representation including timeline media elements that graphically represent lengths of the media items, the timeline representation providing continuous representation of the lengths of the media items, wherein the graphical user interface further includes one or more interface elements that enable a user to select one or more effects to be applied to the sequence of media items; and
   responsive to user interaction with a given interface element to select a given effect to be applied to the sequence of media items, change the graphical user interface to present a tile representation of the sequence of media items, the tile representation including tile media elements that graphically represent the media items in the sequence of media items, the tile representation providing discontinuous representation of the media items, wherein the tile representation of the sequence of media items includes individual tile media elements for individual ones of the media items in the sequence of media items;
   wherein responsive to the sequence of media items including a first media item and a second media item:
   the timeline representation includes a first timeline media element that represents a first length of the first media item and a second timeline media element that represents a second length of the second media item, the timeline representation providing continuous representation of the first length of the first media item and the second length of the second media item; and
   the tile representation includes a first tile media element to represent the first media item and a second tile media element to represent the second media item, the first tile media element and the second tile media element separated in the tile representation to provide discontinuous representation of the first media item and the second media item.

2. The system of claim 1, wherein the tile representation of the sequence of media items includes individual tile media elements for individual video segments that have been selected from one or more of the media items in the sequence of media items for generation of a video edit, wherein responsive to the sequence of media items including the first media item and the second media item and responsive to a first video segment and a second video segment having been selected from the first media item for generation of the video edit:
   the tile representation includes a third tile media element to represent the first video segment from the first media item and a fourth tile media element to represent the second video segment from the first media item, the third tile media element and the fourth tile media element separated in the tile representation to provide discontinuous representation of the first video segment and the second video segment.

3. The system of claim 1, wherein the change to the graphical user interface to present the tile representation of the sequence of media items includes the timeline representation of the sequence of media items changing into the tile representation of the sequence of media items.

4. The system of claim 1, wherein the timeline representation of the sequence of media items is presented in the graphical user interface to enable user selection of segments of the media items for inclusion in a video edit.

5. The system of claim 1, wherein the user interaction with the given interface element to select the given effect to be applied to the sequence of media items, which causes the graphical user interface to change to present the tile representation of the sequence of media items, includes user interaction with the given interface element to change a playback speed of the media items in the sequence of media items.

6. The system of claim 1, wherein the user interaction with the given interface element to select the given effect to be applied to the sequence of media items, which causes the graphical user interface to change to present the tile representation of the sequence of media items, includes user interaction with the given interface element to change an order of the media items in the sequence of media items.

7. The system of claim 1, wherein the user interaction with the given interface element to select the given effect to be applied to the sequence of media items, which causes the graphical user interface to change to present the tile representation of the sequence of media items, includes user interaction with the given interface element to add or remove the media items in the sequence of media items.

8. The system of claim 1, wherein:
responsive to a first video segment and a second video segment having been selected from the first media item for generation of a video edit, the first tile media element represents both the first video segment and the second video segment; and
responsive to user interaction with the first tile media element to apply the given effect, the given effect is applied to both the first video segment and the second video segment in the video edit.

9. A method for presenting a media sequence, the method performed by a computing system including one or more processors, the method comprising:
presenting, by the computing system, a graphical user interface, the graphical user interface including a timeline representation of a sequence of media items, the sequence of media items including media items ordered in a sequence, the timeline representation including timeline media elements that graphically represent lengths of the media items, the timeline representation providing continuous representation of the lengths of the media items, wherein the graphical user interface further includes one or more interface elements that enable a user to select one or more effects to be applied to the sequence of media items; and
responsive to user interaction with a given interface element to select a given effect to be applied to the sequence of media items, changing, by the computing system, the graphical user interface to present a tile representation of the sequence of media items, the tile representation including tile media elements that graphically represent the media items in the sequence of media items, the tile representation providing discontinuous representation of the media items, wherein the tile representation of the sequence of media items includes individual tile media elements for individual ones of the media items in the sequence of media items;
wherein responsive to the sequence of media items including a first media item and a second media item:
the timeline representation includes a first timeline media element that represents a first length of the first media item and a second timeline media element that represents a second length of the second media item, the timeline representation providing continuous representation of the first length of the first media item and the second length of the second media item; and
the tile representation includes a first tile media element to represent the first media item and a second tile media element to represent the second media item, the first tile media element and the second tile media element separated in the tile representation to provide discontinuous representation of the first media item and the second media item.

10. The method of claim 9, wherein the tile representation of the sequence of media items includes individual tile media elements for individual video segments that have been selected from one or more of the media items in the sequence of media items for generation of a video edit, wherein responsive to the sequence of media items including the first media item and the second media item and responsive to a first video segment and a second video segment having been selected from the first media item for generation of the video edit:
the tile representation includes a third tile media element to represent the first video segment from the first media item and a fourth tile media element to represent the second video segment from the first media item, the third tile media element and the fourth tile media element separated in the tile representation to provide discontinuous representation of the first video segment and the second video segment.

11. The method of claim 9, wherein changing the graphical user interface to present the tile representation of the sequence of media items includes the timeline representation of the sequence of media items changing into the tile representation of the sequence of media items.

12. The method of claim 9, wherein the timeline representation of the sequence of media items is presented in the graphical user interface to enable user selection of segments of the media items for inclusion in a video edit.

13. The method of claim 9, wherein the user interaction with the given interface element to select the given effect to be applied to the sequence of media items, which causes the graphical user interface to change to present the tile representation of the sequence of media items, includes user interaction with the given interface element to change a playback speed of the media items in the sequence of media items.

14. The method of claim 9, wherein the user interaction with the given interface element to select the given effect to be applied to the sequence of media items, which causes the graphical user interface to change to present the tile representation of the sequence of media items, includes user interaction with the given interface element to change an order of the media items in the sequence of media items.

15. The method of claim 9, wherein the user interaction with the given interface element to select the given effect to be applied to the sequence of media items, which causes the graphical user interface to change to present the tile representation of the sequence of media items, includes user interaction with the given interface element to add or remove the media items in the sequence of media items.

16. The method of claim 9, wherein:
responsive to a first video segment and a second video segment having been selected from the first media item for generation of a video edit, the first tile media element represents both the first video segment and the second video segment; and
responsive to user interaction with the first tile media element to apply the given effect, the given effect is applied to both the first video segment and the second video segment in the video edit.

17. A system for presenting a media sequence, the system comprising:
one or more physical processors configured by machine-readable instructions to:
present a graphical user interface, the graphical user interface including a timeline representation of a sequence of media items to enable user selection of segments of the media items for inclusion in a video edit, the sequence of media items including media items ordered in a sequence, the timeline representation including timeline media elements that graphically represent lengths of the media items, the timeline representation providing continuous representation of the lengths of the media items, wherein the graphical user interface further includes one or more interface elements that enable a user to select one or more effects to be applied to the sequence of media items; and
responsive to user interaction with a given interface element to select a given effect to be applied to the sequence of media items, change the timeline representation of the sequence of media items into a tile representation of the sequence of media items, the tile representation including tile media elements that graphically represent the media items in the sequence of media items, the tile representation providing discontinuous representation of the media items, wherein the tile representation of the sequence of media items includes individual tile media elements for individual ones of the media items in the sequence of media items;
wherein responsive to the sequence of media items including a first media item and a second media item:
the timeline representation includes a first timeline media element that represents a first length of the first media item and a second timeline media element that represents a second length of the second media item, the timeline representation providing continuous representation of the first length of the first media item and the second length of the second media item; and
the tile representation includes a first tile media element to represent the first media item and a second tile media element to represent the second media item, the first tile media element and the second tile media element separated in the tile representation to provide discontinuous representation of the first media item and the second media item.

18. The system of claim 17, wherein:
responsive to a first video segment and a second video segment having been selected from the first media item for generation of a video edit, the first tile media element represents both the first video segment and the second video segment; and
responsive to user interaction with the first tile media element to apply the given effect, the given effect is applied to both the first video segment and the second video segment in the video edit.

* * * * *